(12) United States Patent  
Cheng et al.

(10) Patent No.: US 9,143,459 B2
(45) Date of Patent: *Sep. 22, 2015

(54) QUEUE SPEED-UP BY USING MULTIPLE LINKED LISTS

(71) Applicant: BROCADE COMMUNICATIONS SYSTEMS, INC., San Jose, CA (US)

(72) Inventors: Joseph Juh-En Cheng, Palo Alto, CA (US); Jian Liu, Palo Alto, CA (US)

(73) Assignee: BROCADE COMMUNICATIONS SYSTEMS, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/253,763

(22) Filed: Apr. 15, 2014

(65) Prior Publication Data

US 2014/0294014 A1    Oct. 2, 2014

Related U.S. Application Data

(63) Continuation of application No. 13/032,445, filed on Feb. 22, 2011, now Pat. No. 8,737,418.

(60) Provisional application No. 61/426,336, filed on Dec. 22, 2010.

(51) Int. Cl.
 *H04L 12/54* (2013.01)
 *H04L 12/863* (2013.01)
 *H04L 12/883* (2013.01)
 *H04L 12/861* (2013.01)

(52) U.S. Cl.
 CPC ........ *H04L 47/6295* (2013.01); *H04L 49/9015* (2013.01); *H04L 49/9047* (2013.01); *H04L 47/6225* (2013.01); *Y02B 60/44* (2013.01)

(58) Field of Classification Search
 CPC ............ H04L 47/6295; H04L 49/9015; H04L 49/9047; H04L 47/6225
 See application file for complete search history.

(56) References Cited

U.S. PATENT DOCUMENTS

| | | | |
|---|---|---|---|
| 7,000,061 B2* | 2/2006 | Varma et al. | 710/310 |
| 7,627,870 B1* | 12/2009 | Michaeli et al. | 719/313 |
| 8,737,418 B2* | 5/2014 | Cheng et al. | 370/429 |
| 2003/0231593 A1* | 12/2003 | Bauman et al. | 370/235 |
| 2004/0120325 A1* | 6/2004 | Ayres | 370/395.42 |
| 2006/0209854 A1* | 9/2006 | Katagiri et al. | 370/401 |
| 2008/0291829 A1* | 11/2008 | Hammar | 370/235 |
| 2011/0261696 A1* | 10/2011 | Crisan et al. | 370/235 |
| 2011/0310739 A1 | 12/2011 | Aybay | |

* cited by examiner

*Primary Examiner* — Ajay Cattungal

(74) *Attorney, Agent, or Firm* — Shun Yao; Park, Vaughan, Fleming & Dowler LLP

(57) ABSTRACT

One embodiment of the present invention provides a switch that includes a transmission mechanism configured to transmit frames stored in a queue, and a queue management mechanism configured to store frames associated with the queue in a number of sub-queues which allow frames in different sub-queues to be retrieved independently, thereby facilitating parallel processing of the frames stored in the sub-queues.

23 Claims, 5 Drawing Sheets

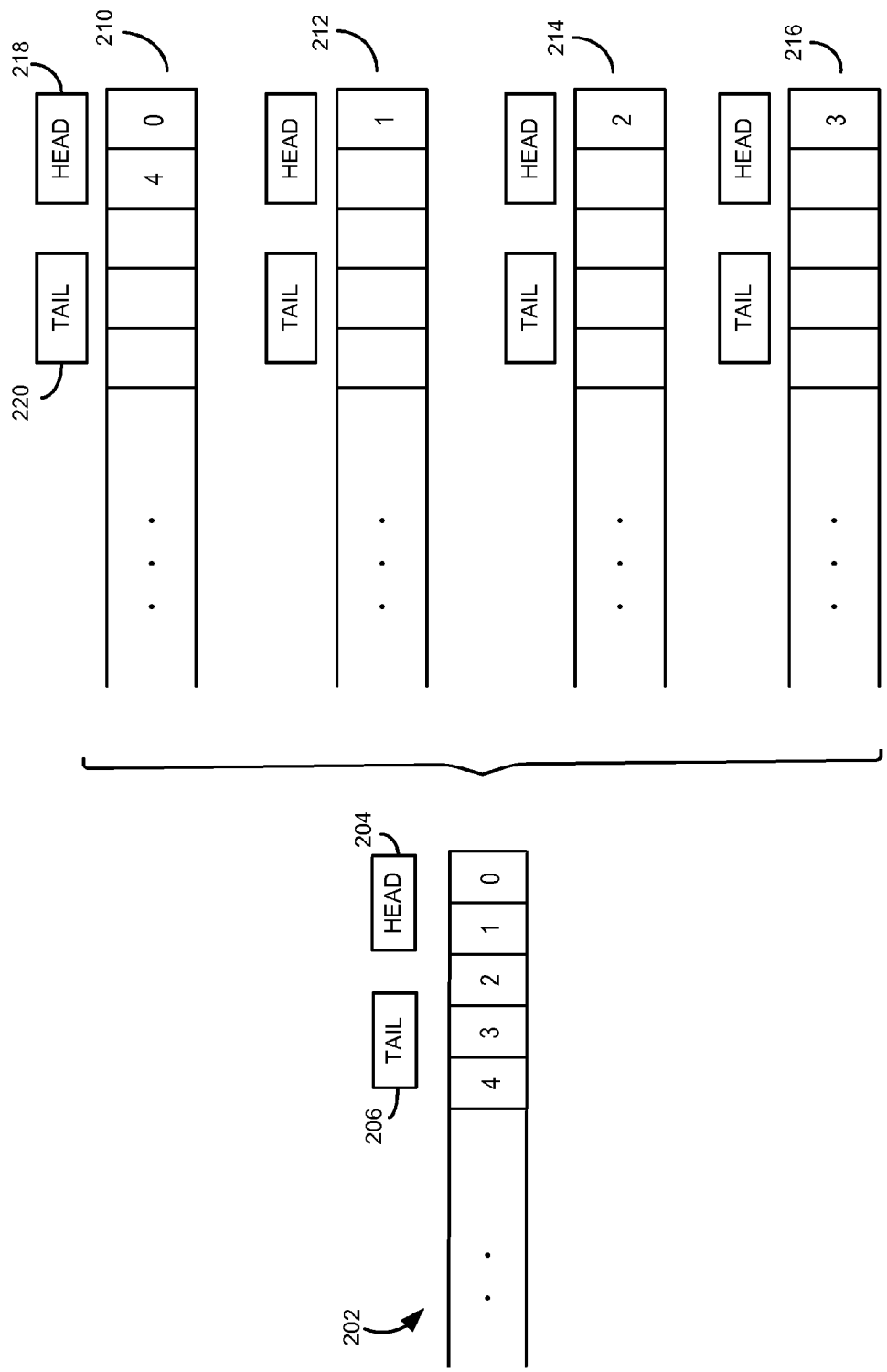

QUEUE SPEED-UP BY USING MULTIPLE LINKED LISTS

RELATED APPLICATION

This application is a continuation of U.S. application Ser. No. 13/032,445, entitled "Queue Speed-Up By Using Multiple Linked Lists," by inventors Joseph Juh-En Cheng and Jian Liu, filed 22 Feb. 2011, which claims the benefit of U.S. Provisional Application No. 61/426,336, entitled "Queue Speed-Up By Using Multiple Linked Lists," by inventors Joseph Juh-En Cheng and Jian Liu, filed 22 Dec. 2010, the contents of which are incorporated herein by reference.

BACKGROUND

1. Field

The present disclosure relates to queue scheduling in communication networks. More specifically, the present disclosure relates to a method and system for enhancing throughput by increasing the dequeue rate.

2. Related Art

The proliferation of the Internet and e-commerce continues to fuel evolutions in the telecom and network industries. Convergence in the underlying network architecture often takes place at a pace faster than the lifespan of most network equipment. For example, a large enterprise network today may contain Internet Protocol (IP) networks, storage area networks (SANs), Ethernet-based access networks, and leased lines and switches from telephone service providers. How to manage and fully utilize the equipment capacity in a heterogeneous environment remains an ongoing challenge.

To maximize returns on capital expenditures, many network architects prefer re-using existing equipment to switch data packets of different formats and aggregating low-speed switch ports to provision high-speed logical links. To achieve such a goal, I/O consolidation is needed. I/O consolidation is the ability to carry different types of traffic, having different characteristics and handling requirements, over the same physical media.

In storage networking, Fibre Channel (FC) is the most widely used protocol, and is an essential component in I/O consolidation solutions for data centers. Fibre Channel over Ethernet (FCoE) allows FC traffic to be transported over an Ethernet network. Hence, an Ethernet network can be used in a data center for consolidating flows from FC and Internet Protocol (IP), as well as other types of traffic. As a result, different types of traffic can share a single, integrated infrastructure, thereby reducing network complexities in the data center.

In an FCoE switch, a queue manager manages a number of Ethernet queues as well as FC queues, and a scheduler is responsible for scheduling frames from all the queues for transmission. In order to increase the network throughput, it is important for switch to have a fast dequeue rate. However, the dequeue rate is often limited by the roundtrip communication time between the scheduler and the queue manager.

SUMMARY

One embodiment of the present invention provides a switch that includes a transmission mechanism configured to transmit frames stored in a queue, and a queue management mechanism configured to store frames associated with the queue in a number of sub-queues which allow frames in different sub-queues to be retrieved independently, thereby facilitating parallel processing of the frames stored in the sub-queues.

In a variation on this embodiment, the sub-queues are implemented using linked lists, each having a head and a tail pointer. The head and tail pointers for the linked lists are maintained by the queue management mechanism.

In a further variation, the switch also includes a linked-list manager configured to store the linked lists corresponding to the sub-queues and to update the head pointers maintained by the queue management mechanism.

In a variation on this embodiment, the queue management mechanism further includes a first counter associated with the queue, and a current count of the first counter specifies in which sub-queue an incoming frame is to be enqueued.

In a further variation, the queue management mechanism is configured to enqueue the incoming frame to a sub-queue following a round-robin sequence.

In a variation on this embodiment, the queue management mechanism further includes a second counter associated with the queue, and a current count of the second counter specifies from which sub-queue an outgoing frame is to be dequeued.

In a further variation, the outgoing frame is dequeued from the sub-queues following a round-robin sequence.

In a variation on this embodiment, the sub-queues include at least one queue that is associated with an inactive output port.

In a variation on this embodiment, the switch is a Fibre Channel over Ethernet (FCoE) switch.

In a variation on this embodiment, the queue is associated with a priority class.

In a variation on this embodiment, the queue is a Fibre Channel (FC) virtual channel (VC) queue configured to store frames belonging to a particular VC.

BRIEF DESCRIPTION OF THE FIGURES

This disclosure is illustrated by way of example and not by way of limitation in the accompanying drawings Like reference numerals refer to similar elements.

FIG. 2 presents a block diagram illustrating the logical division of a queue into multiple sub-queues in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

In embodiments of the present disclosure, the problem of limited dequeue speed is solved by logically dividing a physical queue into multiple sub-queues. The sub-queues are implemented using linked lists, with each sub-queue having its own head and tail pointers. The implementation of the sub-queues makes it possible to parallely schedule frame transmission, even for frames from the same logical queue, thus significantly increasing the throughput of the switch.

Although the present disclosure is presented using examples based on FCoE networks, embodiments of the present invention are not limited to the FC or FCoE networks, or networks defined in a particular Open System Interconnection Reference Model (OSI reference model) layer. Embodiments of the present invention can be implemented in any type of networks that involve dequeue operation.

Queuing System

Figure 1:
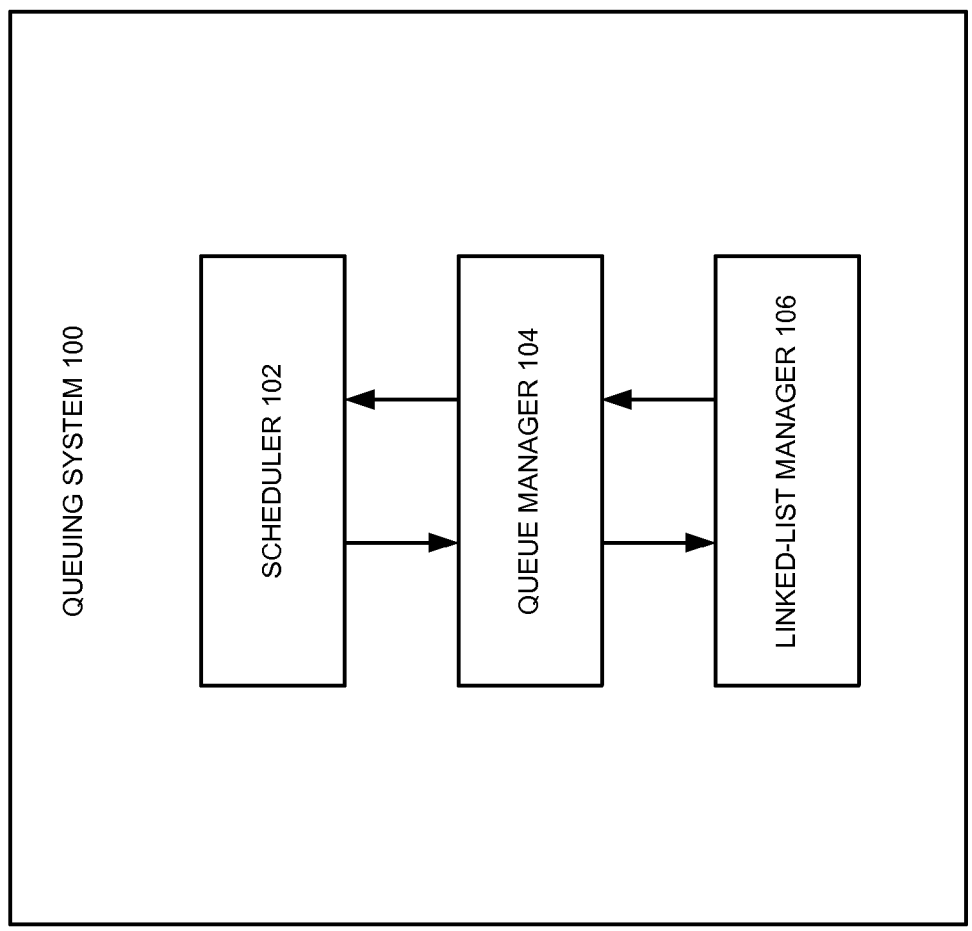
FIG. 1 presents a block diagram illustrating an exemplary queuing system in accordance with an embodiment of the present invention.

FIG. 1 presents a block diagram illustrating an exemplary queuing system in accordance with an embodiment of the present invention. Queuing system 100 includes a scheduler 102, a queue manager 104, and a linked-list manager 106.

During dequeue, scheduler 102 is responsible for scheduling frame transmission from all the queues, including Ethernet queues and FC queues. In a typical FCoE switch, an Ethernet port can include up to 8 queues, one for each priority, and the FCoE switch can include 24 Ethernet ports. In addition, the FCoE switch can include 8 FC ports divided into two output trunks, with each output trunk including 32 virtual channels, each of which corresponds to a queue. In this scenario, scheduler 102 can arbitrate between 24×8 Ethernet queues and 2×32 FC queues.

Scheduler 102 can use a number of criteria to decide which frame gets transmitted. The criteria include, but are not limited to: whether the queue is non-empty, the queue's priority, whether the transmitting buffer is ready to accept another frame, whether the Ethernet port is paused, and whether VC credit is available.

During operation, scheduler 102 chooses a queue to dequeue based on the aforementioned criteria and sends the selection to queue manager 104 to execute. In one embodiment, scheduler 102 communicates the identifier of the selected queue (QID) to queue manager 104. Note that, in order to allow multiple queues to share the same memory structure, the system implements a linked list for storing the frames in the main memory. The head and tail pointers of a linked list are maintained by queue manager 104 and linked-list manager 106 stores the linked list.

To dequeue a selected queue, queue manager 104 pops the top frame stored in the selected queue as indicated by the head pointer, and then requests linked-list manager 106 to read the popped head pointer's queue descriptor to get the pointer for the next frame in that queue, which becomes the subsequent head pointer. Linked-list manager 106 passes the queue descriptor information to a frame editor, and also passes the frame identifier (FID) of the old head pointer to the transmitting buffer, which in turn fetches the frame data from the main memory.

After a frame has been popped from the selected queue, scheduler 102 is ready to schedule the next transmission by selecting a next queue for the dequeue operation. The process repeats itself for each transmitted frame. As one can see, the latency associated with dequeuing one frame involves the roundtrip delay of the control signals exchanged among scheduler 102, queue manager 104, and linked-list manager 106. Particularly, the signaling delay between queue manager 104 and linked-list manager 106 can impose a bottleneck to the throughput of the dequeue operation. For example, assume a typical system clock rate to be 360 MHz. To transmit a frame, the signaling roundtrip delay is typically about 30 clock cycles, which translate to roughly 12 million Ethernet packets per second. However, with an Ethernet port operating at 100 Gbps, the port needs to transmit about 150 million packets per second to fully utilize its capacity. Although one can either increase the clock rate to reduce the roundtrip delay, or integrate the scheduler, the queue manager, and the linked-list manager to reduce the signaling delay, these approaches are limited by currently available hardware technology.

To increase the system throughput, in embodiments of the present invention, a queue, such as an Ethernet priority queue, is logically divided into multiple sub-queues. Each sub-queue maintains its own linked list with head and tail pointers, thus allowing the scheduler to perform multiple dequeue operations in parallel.

Note that although scheduler 102 and queue manager 104 are shown as two separate blocks in FIG. 1, in various embodiments of the present invention these two modules can be implemented within the same entity. The example illustrated in FIG. 1 should not be interpreted as limiting embodiments of the present invention to only the configuration shown in FIG. 1.

FIG. 2 presents a block diagram illustrating the logical division of a queue into multiple sub-queues in accordance with an embodiment of the present invention. Queue 202 is a conventional physical queue storing a number of frames labeled as frames 0-4. Note that to demonstrate the sequential order of the frames, in FIG. 2 queue 202 appears to be a first-in-first-out (FIFO) queue. In reality, queue 202 can be implemented as a linked list, and each frame within queue 202 can be stored in arbitrary locations in the main memory. The linked list itself is stored in the linked-list manager. A head pointer 204 pointing to the first node of the list and a tail pointer 206 pointing to the last node of the list are maintained by the queue manager. Each time a frame is popped (dequeued) from queue 202, the linked-list manager updates head pointer 204 before the next frame in queue 202 can be dequeued. Correspondingly, before the next frame can be dequeued, the queue manager queries the linked-list manager to obtain the updated head pointer of the queue so the correct frame can be retrieved from the memory. This query process between the queue manager and the linked-list manager incurs latency that limits the dequeue throughput.

To increase the dequeue speed, a queue, such as queue 202, is logically divided into multiple sub-queues, and the multiple sub-queues all receive frames belonging to the same priority class. In FIG. 2, queue 202 is logically divided into 4 sub-queues 210-216. Each sub-queue has its own linked list and corresponding head and tail pointers. For example, sub-queue 210 has a head pointer 218 and a tail pointer 220 pointing to the first and last nodes of the list, respectively. Similar to the previous case, the linked lists for the sub-queues are stored in the linked-list manager, and the head and tail pointers for the linked lists are maintained by the queue manager. Because each sub-queue has its own linked list with head and tail pointers independently maintained by the queue manager, during the dequeue process, when pulling frames from the same queue, the scheduler does not need to wait for the queue manager to obtain the updated head pointer from the linked-list manager. Instead, the scheduler can immediately schedule the next frame to be dequeued because the next frame is from a different sub-queue. In other words, the queue manger can pull frames from all the sub-queues corresponding a same queue while waiting for the head pointers to be updated, thus effectively achieving a pipelined parallel processing among the multiple sub-queues. This configuration can significantly enhance the dequeue speed. For a queue being divided logically into 4 sub-queues, the dequeue speed can be increased approximately four-fold. Note that, from a user's point of view, there is only one queue per priority class. Frames belonging to a respective priority class are pushed into the same queue corresponding to the priority class, and these frames are distributed among the sub-queues associated with this queue.

In one embodiment, when frames arrive at queue 202, they are distributed to sub-queues 210-216 in a round-robin fashion. For example, frame 0 is pushed into sub-queue 210, frame 1 into sub-queue 212, frame 2 into sub-queue 214, frame 3 into sub-queue 216, and frame 4 back to sub-queue 210. To ensure that the frame order is maintained, a queue-select counter (or a sub-queue counter) is introduced to keep track of in which sub-queue an incoming frame will be stored. In one embodiment, the counter is a cyclic counter that outputs a count value of a repeating sequence, and the number of items included in the repeating sequence is the same as the number of the sub-queues. In the example shown in FIG. 2, the counter outputs a repeating count sequence that includes 4 numbers, such as 0, 1, 2, and 3. In one embodiment, the queue manager controls the sub-queue counter during enqueue. In a further embodiment, the sub-queue counter is embedded in the unused bits within the QID. For example, if a queue is logically divided into 4 sub-queues, the corresponding QID of an incoming frame may includes a 2-bit counter indicating which sub-queue the incoming frame will enter. For example, if the 2-bit counter reads "00," then an incoming frame will enter sub-queue 210. Afterward, the 2-bit counter increments to read "01," indicating that a subsequent incoming frame will enter sub-queue 212.

To maintain the same sequential order of the frames during dequeue, the system needs to pull frames out of the sub-queues following the same order used during the enqueue process. In one embodiment, the scheduler maintains a separated dequeue sub-queue counter to determine which sub-queue is to be dequeued. The sequential order of the dequeue sub-queue counter is the same as that of the enqueue sub-queue counter. In the example shown in FIG. 2, during the dequeue operation for queue 202, the dequeue sub-queue counter starts from a count of "0" for dequeueing the first frame (frame 0), and increments by "1" for each following frame. The "0" counts indicates that the current sub-queue to be dequeued is sub-queue 210. Accordingly, the head frame of sub-queue 210 (frame 0) is popped, and the dequeue sub-queue counter increments by 1. When the scheduler is scheduling a next frame to be popped from queue 202, it uses the dequeue counter to determine that the next sub-queue of queue 202 to be dequeued is sub-queue 212. Accordingly, the head frame of sub-queue 212 (frame 1) is popped.

Figure 3A:
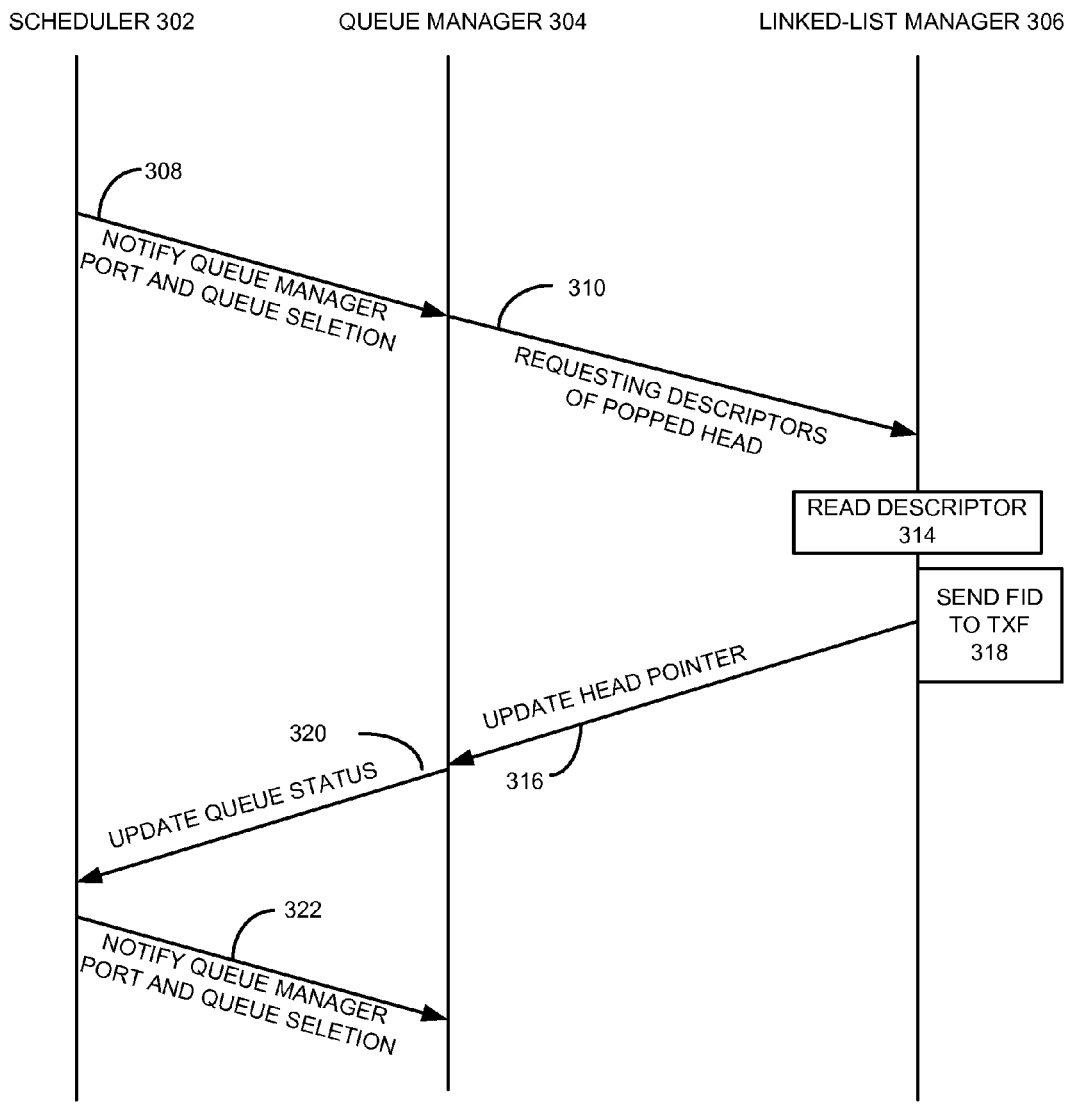
FIG. 3A presents a time-space diagram illustrating a conventional dequeue process (prior art).

FIG. 3A presents a time-space diagram illustrating a conventional dequeue process (prior art). During operation, a scheduler 302 notifies a queue manger 304 a selected output port and a priority queue that is active for that port (operation 308). The output port and priority queue is selected based on a set of predetermined policies. In one embodiment, the output port and the priority queue are selected in a round-robin fashion. In response, queue manager 304 pops the current head frame out of its head-pointer memory for the selected queue and requests a linked-list manager 306 to read the popped head's descriptive information (denoted as "descriptor") to get the next pointer (operation 310) (this information is provided by the linked-list). Linked-list manager 306 reads the descriptor (operation 314), updates the head pointer in queue manager 304 (operation 316), and sends the popped head-pointer frame identifier (FID) to the transmitter FIFO (TXF) to begin fetching the frame data (operation 318). Subsequently, queue manger 304 informs scheduler 302 which queues are non-empty (updates queue status) (operation 320), and scheduler 302 is then ready to schedule the next transmission by selecting the next logical port and the priority queue (operation 322). As one can see from FIG. 3A, a roundtrip delay among scheduler 302, queue manager 304, and linked-list manager 306 (especially a bottleneck between queue manager 304 and linked-list manager 306) exists before scheduler 302 is able to schedule the transmission of a next frame, thus limiting the maximum dequeue rate.

Figure 3B:
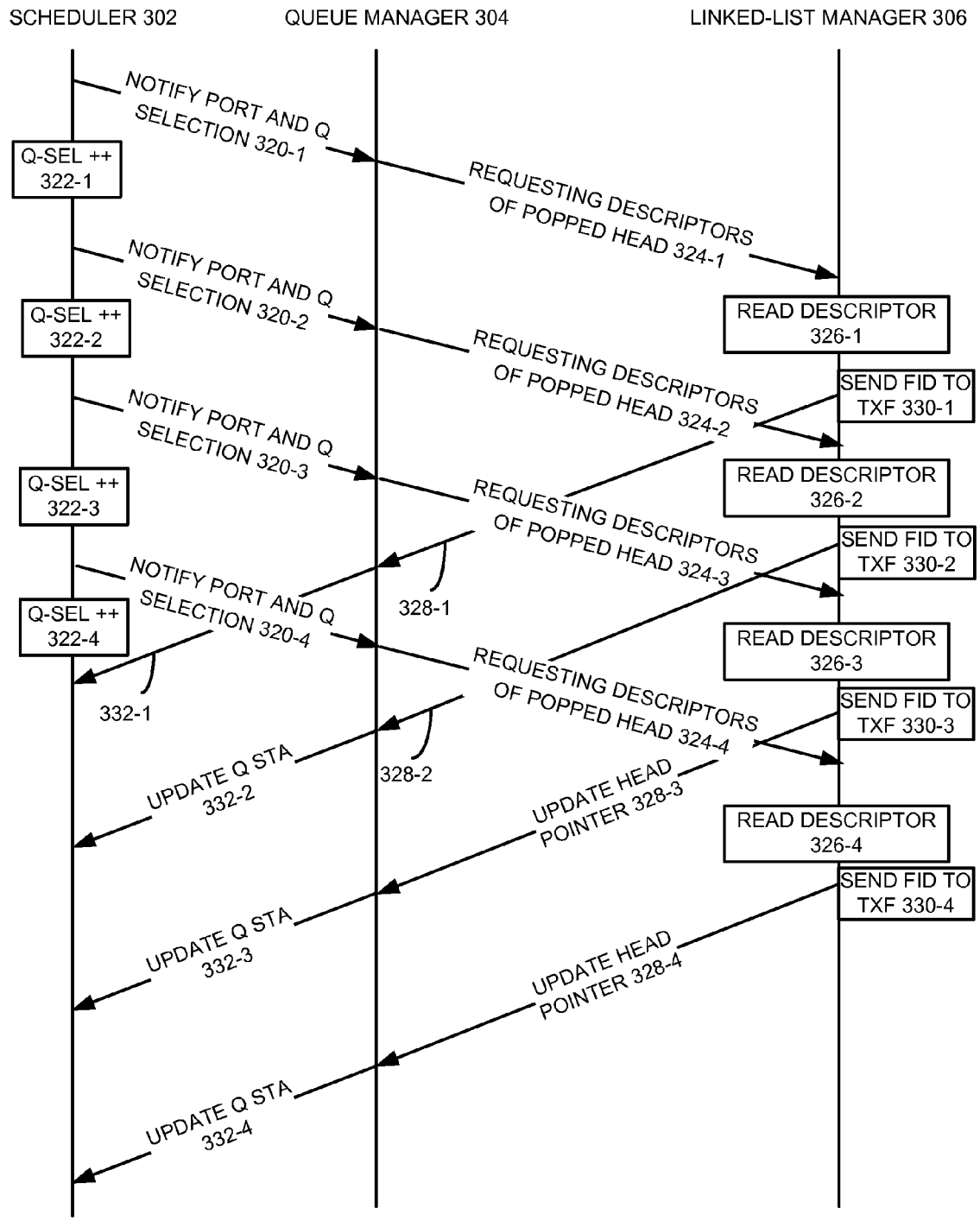
FIG. 3B presents a time-space diagram illustrating a speeded up dequeue process in accordance with an embodiment of the present invention.

FIG. 3B presents a time-space diagram illustrating a speeded up dequeue process in accordance with an embodiment of the present invention. In this example, each priority queue is divided into four sub-queues. During operation, a scheduler 302 notifies a queue manger 304 a selected output port and a priority queue that is active for that port (operation 320-1), and increment its sub-queue select counter (operation 322-1). In one embodiment, scheduler 302 communicates a QID, which includes a sub-queue select counter indicating the selected sub-queue, to queue manager 304. In response, queue manager 304 pops the current head frame out of its head-pointer memory for the selected sub-queue and requests a linked-list manager 306 to read the popped head's descriptor to get the next pointer (operation 324-1). Linked-list manager 306 reads the descriptor (operation 326-1), updates the head pointer in queue manager 304 (operation 328-1), and sends the popped head-pointer FID to the transmitter FIFO (TXF) to begin fetching the frame data (operation 330-1). Subsequently, queue manger 304 informs scheduler 302 which queues are non-empty (updates queue status) (operation 332-1).

As one can see, the operations to dequeue a particular sub-queue is similar to the one shown in FIG. 3A, except that in FIG. 3B scheduler 302 increments its sub-queue select counter after notifying queue manager 304 its port and queue selection. However, the main difference between FIG. 3A and FIG. 3B is that, before scheduler 302 receives the queue status update from queue manager 304, scheduler 302 can schedule subsequent transmissions. In the example shown in FIG. 3B, while waiting for the queue status updates from queue manager 304, scheduler 302 sends three more notifications indicating its subsequent port and sub-queue selections to queue manager 304 (operations 320-2, 320-3, and 320-4), and increments its sub-queue select counter (operations 322-2, 322-3, and 322-4). In response to receiving the scheduling notifications, queue manager 304 sequentially requests descriptors of the popped head pointers from linked-list manager 306 (operations 324-2, 324-3, and 324-4). Linked-list manager 306 then sequentially performs a series of operations in response to receiving the requests from queue manger 304. These operations include reading descriptors of the popped heads (operations 326-2, 326-3, and 326-4), updating the head pointers in queue manager 304 (operations 328-2, 328-3, and 328-4), and sending the popped head-pointers' FIDs to the TXF (operations 330-2, 330-3, and 330-4). Each time after queue manger 304 receives an updated head pointer from linked-list manager 306, queue manger 304 sends a queue status update to scheduler 302 (operations 332-2, 332-3, and 332-4).

As one can see from FIG. 3B, multiple dequeue operations can be pipelined through scheduler 302, queue manager 304, and linked-list manager 306 despite the roundtrip delay. In other words, the queuing system can parallelly perform dequeue operations over the multiple sub-queues, thus significantly increasing the dequeue speed. In fact, because the majority of latency is due to the communication delay among scheduler 302, queue manager 304, and linked-list manager 306, in the example shown in FIG. 3B, the parallel dequeue operation of the four sub-queues can almost increase the dequeue speed of the system four-fold. To ensure that the head pointer of a sub-queue has been updated before the same sub-queue is scheduled to be dequeued again, the system needs to make sure not to schedule more transmissions than the number of sub-queues within the round-trip communication interval among scheduler 302, queue manager 304, and linked-list manager 306. On the other hand, it is possible to implement as many sub-queues for one logical queue as necessary to attain a fully pipelined dequeue operation.

Dynamic Queues

In a multi-chip system where a large number of queues already exist, instead of logically dividing a queue into sub-queues, which may result in queue numbers overwhelming the queue manager, the system can implement dynamic queue allocation. Such a large number of queues makes it challenging for speeding up the dequeue rate by dividing a physical queue into multiple sub-queues because the number of total queues will be too large for the queue manager to manage.

In one embodiment, instead of logically dividing a physical queue into multiple sub-queues, the system utilizes queues from unused ports by grouping queues from multiple ports into a logical queue. In other words, a physical queue now becomes the "sub-queue" of the logical queue. Because each physical queue has its own head and tail pointer stored in the queue manager, the system can also dequeue parallelly. For example, for the same 48-chip system, if only one or two ports are actively running at 100 Gbps while other ports are not used, then for each logical queue associated with an active port, the system can allocate up to 17 physical queues as "sub-queues" for the logical queue, with 16 of the 17 physical queues coming from other unused ports. In a further embodiment, the system can dynamically allocate physical queues to act as "sub-queues" for a priority class.

To ensure that a frame is enqueued and dequeued in order, the system keeps track of the sequence of the "sub-queues." In one embodiment, the system maintains an enqueue counter which tracks which "sub-queue" a current frame enters. When dequeuing, the system selects a "sub-queue" to pop a frame based on the current dequeue counter number.

Switch Chip Implementation

Figure 4:
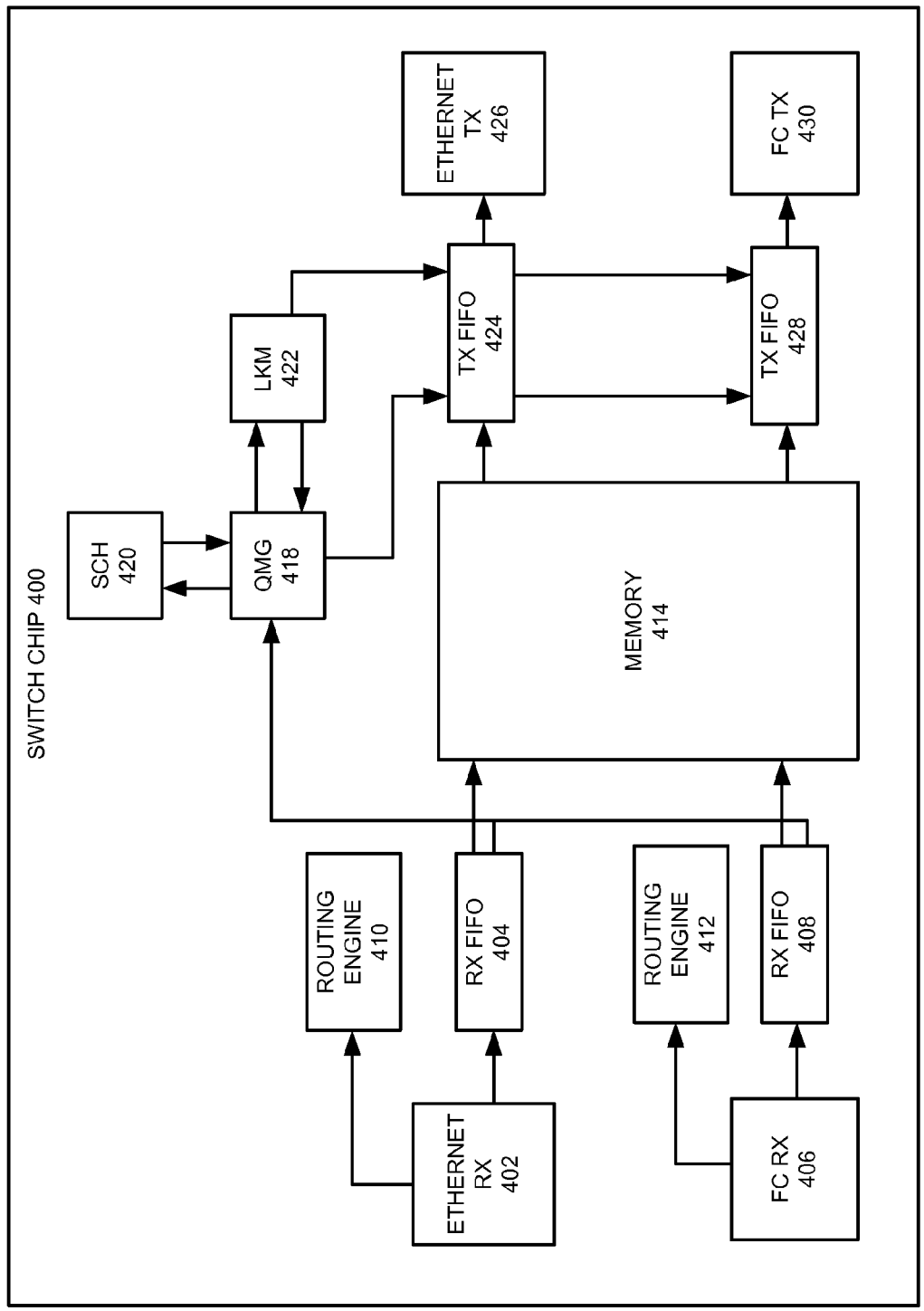
FIG. 4 presents a block diagram illustrating the architecture of an exemplary FCoE switch chip implementing the queuing system, in accordance with an embodiment of the present invention.

FIG. 4 presents a block diagram illustrating the architecture of an exemplary FCoE switch chip implementing the queuing system in accordance with an embodiment of the present invention. Switch chip 400 includes a number of modules, including, but not limited to: an Ethernet receiver module 402, an Ethernet receiving FIFO 404, an FC receiver module 406, an FC receiving FIFO 408, an Ethernet routing engine 410, an FC routing engine 412, a memory block 414, a queue manager (QMG) 418, a scheduler (SCH) 420, a linked-list manager (LKM) 422, an Ethernet transmitting FIFO 424 (which corresponds to "TXF" in FIGS. 3A and 3B), an Ethernet transmitter module 426, an FC transmitting FIFO 428, and an FC transmitter module 430.

Ethernet receiver module 402 includes a number of Ethernet receiving ports operating at various data rates. In one embodiment, Ethernet receiver module 402 includes 24 Ethernet ports operating at a data rate of up to 10 Gbps per port. FC receiver module 406 includes a number of FC ports. In one embodiment, FC receiving module 406 includes 8 FC ports operating at 8.5 Gbps. Ethernet receiving FIFO 404 and FC receiving FIFO 408 buffer received frames until they are written into memory block 414. When a frame arrives from an external Ethernet port, Ethernet receiving FIFO 404 waits for instruction from Ethernet routing engine 410, which makes frame forwarding/routing decisions based on the frame header, before storing the frame into memory block 414. Similarly, when a frame arrives from an external FC port, FC receiving FIFO 408 waits for instruction from FC routing engine 412, which makes frame forwarding/routing decisions based on the frame header, before storing the frame into memory block 414.

When a frame is determined to be in order, the frame identifier (FID) information is passed to queue manager 418 so the frame can be enqueued for transmission. In addition to managing the push request, queue manager 418 also manages pop requests arriving from scheduler 420, which is responsible for selecting the next queue to pop from based on current priority and credit status. Linked-list manager 422 stores the queuing descriptor for each frame and writes the next-pointer from one frame to the next when they reside in the same queue. During frame enqueue, queue manager 416 passes an FID and next-pointer request to linked-list manager 422 to form the linked list of frames in a queue.

Ethernet transmitting FIFO 424 and FC transmitting FIFO 428 handle all the frame fetches for transmission. When an FID is popped from a transmit queue, the transmitting FIFOs read the first buffer from memory block 414 while storing the frame data in a FIFO buffer. Ethernet transmitter module 426 includes a number of Ethernet output ports. In one embodiment, Ethernet transmitter module 426 includes 24 output ports. FC transmitter module 430 includes a number of FC output ports. In one embodiment, FC transmitter module 430 includes 8 output ports.

Although in the examples described herein there are four sub-queues per priority queue, embodiments of the present invention can implement any number, such as 3, 8, or 10, of sub-queues for each physical queue. In addition, the queuing system can have more or less components than the scheduler, the queue manager, and the linked-list manager.

Furthermore, although the queue-speed-up techniques described with examples based on transmission queues, embodiments of the present invention can be used in any type of queuing mechanisms. For example, the queue does not need to be exclusively associated with a single output port.

The examples presented herein are for illustration purposes only and should not limit the scope of this disclosure. In general, embodiments of the present invention provide a new type of queuing mechanism, which logically divides a physical queue into multiple sub-queues, with each sub-queue having its own linked list and its own head and tail. Such a novel queuing mechanism enables parallel dequeue operations, thus significantly increasing the system throughput.

The data structures described in this detailed description are typically stored on a computer-readable storage medium, which may be any device or medium that can store code and/or data for use by a computer system. This includes, but is not limited to, application-specific integrated circuits (ASIC), field-programmable gate arrays (FPGA), volatile memory, non-volatile memory, magnetic and optical storage, or other media capable of storing computer-readable media now known or later developed.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A switch apparatus, comprising:
   a transmission module adapted to determine corresponding output ports for frames stored in a queue;
   a queue management module adapted to:
   store frames associated with the queue in a number of sub-queues; and
   prior to receiving a queue status update of a previously selected first sub-queue from which a first frame has been retrieved, select a second sub-queue for retrieving a second frame and schedule subsequent transmission for the first and second frames, thereby facilitating parallel processing among the sub-queues.

2. The switch apparatus of claim 1, wherein the sub-queues are implemented using linked lists, each having a head and a tail pointer, and wherein head and tail pointers for the linked lists are maintained by the queue management module.

3. The switch apparatus of claim 2, further comprising a linked list manager adapted to:
   store the linked lists corresponding to the sub-queues; and
   update the head pointers maintained by the queue management module.

4. The switch apparatus of claim 1, wherein the queue management module further comprises a first counter associated with the queue, and wherein a current count of the first counter specifies in which sub-queue an incoming frame is to be enqueued.

5. The switch apparatus of claim 4, wherein the queue management module is adapted to queue the incoming frame to a sub-queue following a round-robin sequence.

6. The switch apparatus of claim 1, wherein the queue management mechanism further comprises a second counter associated with the queue, and wherein a current count of the second counter specifies from which sub-queue an outgoing frame is to be dequeued.

7. The switch apparatus of claim 6, wherein the outgoing frame is dequeued from the sub-queues following a round-robin sequence.

8. The switch apparatus of claim 1, wherein the sub-queues include at least one queue that is associated with an inactive output port.

9. The switch apparatus of claim 1, wherein the switch is a Fibre Channel over Ethernet (FCoE) switch.

10. The switch apparatus of claim 1, wherein the queue is associated with a priority class.

11. The switch apparatus of claim 1, wherein the queue is a Fibre Channel (FC) virtual channel (VC) queue configured to store frames belonging to a particular VC.

12. A method for facilitating queuing of communication frames at a switch, comprising:
   determining corresponding output ports for frames stored in a queue;
   storing frames associated with the queue in a number of sub-queues; and
   prior to receiving a queue status update of a previously selected first sub-queue from which a first frame has been retrieved, selecting a second sub-queue for retrieving a second frame and schedule subsequent transmission for the first and second frames, thereby facilitating parallel processing among the sub-queues.

13. The method of claim 12, further comprising:
   implementing the sub-queues using linked lists, each having a head and a tail pointer; and
   maintaining head and tail pointers for the linked lists in a queue manager.

14. The method of claim 13, further comprising:
   storing the linked lists corresponding to the sub-queues in a linked-list manager; and
   updating, by the linked-list manager, a respective head pointers maintained in the queue manager after a frame is retrieved from a sub-queue.

15. The method of claim 12, further comprising maintaining a first counter associated with the queue, wherein a current count of the first counter specifies in which sub-queue an incoming frame is to be enqueued.

16. The method of claim 15, wherein the incoming frame is enqueued to a sub-queue following a round-robin sequence.

17. The method of claim 12, further comprising maintaining a second counter associated with the queue, and wherein a current count of the second counter specifies from which sub-queue an outgoing frame is to be dequeued.

18. The method of claim 17, wherein the outgoing frame is dequeued from the sub-queues following a round-robin sequence.

19. The method of claim 12, wherein storing the frames in the sub-queues involves storing at least one frame in a queue that is associated with an inactive output port.

20. The method of claim 12, wherein the switch is a Fibre Channel over Ethernet (FCoE) switch.

21. The method of claim 12, wherein the queue is associated with a priority class.

22. The method of claim 12, wherein the queue is a Fibre Channel (FC) virtual channel (VC) queue configured to store frames belonging to a particular VC.

23. A switch circuit, comprising:
   a transmission circuit adapted to determine corresponding output ports for frames stored in a queue;
   a queue management circuit adapted to:
   store frames associated with the queue in a number of sub-queues; and
   prior to receiving a queue status update of a previously selected first sub-queue from which a first frame has been retrieved, select a second sub-queue for retrieving a second frame and schedule subsequent transmission for the first and second frames, thereby facilitating parallel processing among the sub-queues.

* * * * *